Figure 1:
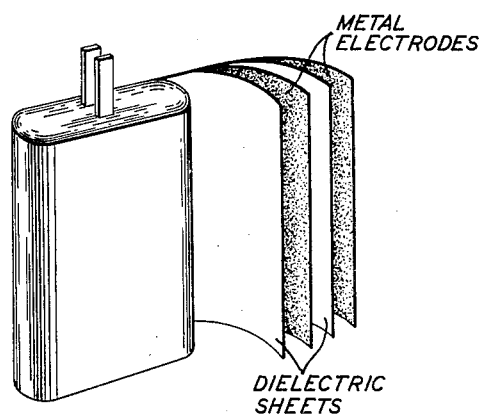

Dec. 25, 1945.  L. EGERTON  2,391,689

STABILIZATION OF HALOGENATED COMPOUNDS

Filed Nov. 14, 1940

INVENTOR
L. EGERTON
BY
ATTORNEY

Patented Dec. 25, 1945

2,391,689

UNITED STATES PATENT OFFICE 2,391,689

STABILIZATION OF HALOGENATED COMPOUNDS

Lawson Egerton, Summit, N. J., assignor to Bell Telephone Laboratories, Incorporated, New York, N. Y., a corporation of New York Application November 14, 1940, Serial No. 365,634

10 Claims. (Cl. 175—41)

The present invention relates to compositions of matter comprising halogen-containing organic substances which are treated to render them non-corrosive of metals, and to apparatus, more particularly electrical apparatus, such as electrical condensers, in which such treated halogen-containing organic substances are maintained in contact with metal.

It is an object of the present invention to prolong the life of electrical capacitors which employ, in contact with metal armatures, dielectrics containing organic substances which possess halogen atoms within their molecules, and to stabilize such capacitors so that their dielectrics retain more uniform values of leakage current and power factor.

It is a more general object of the present invention to treat halogen-containing organic substances which are maintained in contact with metal, or are intended to be maintained in contact with metal, so as to render them non-corrosive.

Halogenated aryl compounds and more particularly the halogenated aromatic hydrocarbons, such as chlorinated diphenyl and chlorinated naphthalene, are known to be useful electrical insulating materials because of their relatively high thermal stability, resistance to oxidation, non-inflammability, low conductivity and other valuable properties. Most of the halogenated aromatic hydrocarbons used commercially are made up of polar molecules and, therefore, possess a high dielectric constant which makes them especially useful in capacitors.

Despite these advantages, dielectrics containing such compounds often deteriorate at a faster rate than do the dielectric materials which do not contain halogens, particularly when employed under moderately elevated temperatures, high electrical stress or both. This deterioration may manifest itself in one or more of three ways. The leakage current may rise to an unduly high value or in the case of condensers operating on alternating current the power factor may rise unduly. The deterioration may also result in the complete breakdown of the dielectric within a short time causing a short circuit of the apparatus.

This deterioration has been found to be associated with a chemical interaction between the metallic elements of the apparatus and the halogenated compounds or their halogen-containing decomposition products.

When the metal in contact with the halogenated compound is aluminum, it is apparently the decomposition products of the halogenated material which interact with the metal. In an electrical capacitor, for instance, having aluminum armatures separated by paper which is impregnated with a halogenated aromatic hydrocarbon such as chlorinated naphthalene or chlorinated diphenyl, it appears that upon the application of an electrical potential, particularly at a moderately elevated temperature, hydrogen chloride and other acid, halogen-containing decomposition products are split off from the chlorinated compound. The hydrogen chloride or halogen ion from other decomposition products appears to attack the aluminum armatures forming aluminum chloride, which is a powerful catalyst for the decomposition of organic compounds. The thus-formed aluminum chloride causes the further decomposition of the chlorinated impregnant, with the production of more halogen containing decomposition products, which react with the aluminum, forming more aluminum chloride. The cycle is thus continued at an accelerated rate. Both the hydrogen chloride and the aluminum chloride contribute to the decomposition of the paper and also increase local conductivity, causing the generation of heat which accelerates the breakdown of the chlorinated impregnant and which accelerates the electrolysis of the paper. The hydrogen chloride which is split off in the initial decomposition of the chlorinated compound is produced in such small quantities that it would not cause the rapid destruction of the dielectric, but the accelerating action of the aluminum chloride produced by the reaction of the hydrogen chloride with the metal armatures causes relatively rapid deterioration.

In other cases, such as when tin is maintained in contact with the halogenated hydrocarbon, there appears to be a direct reaction between the halogenated substance and the metal without the necessity of the application of an electric field. Thus, when an electrical capacitor made up of tin foil armatures separated by paper which is impregnated with a halogenated aromatic hydrocarbon, such as chlorinated naphthalene or chlorinated diphenyl, is heated to moderately elevated temperatures, it shows an initial high power factor. Similar condensers having aluminum electrodes have, by way of contrast, a relatively low initial power factor when heated to moderately elevated temperatures; the power factor increases only after the application of an electrical potential which, as discussed above, is assumed to cause the splitting off of hydrogen chloride from the impregnant. The high initial power factor of the tin foil capacitors obviously results from a direct interaction between the halogenated impregnant and the tin foil armatures at elevated temperatures.

It has been found that the addition of corrosion inhibitors to the halogenated aromatic hydrocarbons or other halogenated organic compounds used as impregnants in electrical capacitors will decrease to a marked extent the deterioration of the dielectrics of such capacitors, as evidenced by longer life and lower and more uniform values of leakage current and power factor. These corrosion inhibitors apparently function by materially retarding the rate at which the metal armatures are attacked by the halogenated impregnants or their halogen-containing decomposition products. Thus, the cycle of deterioration of condenser dielectrics described above is interrupted. The small amount of hydrogen chloride initially formed in the dielectric is not of itself sufficient to cause rapid deterioration in the absence of other harmful reaction products whose formation is induced by the armature metals.

The present invention is based upon the discovery of the fact that the addition of small amounts of maleic anhydride or its alkyl substituted derivatives to halogenated organic compounds used as dielectrics for electrical condensers, particularly those having aluminum or tin armatures, will improve the performance of such condensers, presumably because of the action of maleic anhydride or its derivatives in inhibiting the above-described interaction between the metal armatures and the halogenated organic compound or its halogen-containing decomposition products. The improved performance of such condensers containing maleic anhydrides or its derivatives lies chiefly in the material extension of the life of these condensers.

Figure 2:

In the drawing:

Fig. 1 represents a simple rolled condenser of the type to which the present invention is applicable; and Fig. 2 shows a sectional view of a portion of the electrodes and dielectric sheets of Fig. 1.

The rolled condenser of Fig. 1 is made up of alternate layers of metal foil such as aluminum or tin foil separated by sheets of dielectric material. Such condensers are commonly prepared by interleaving two dielectric sheets, as paper, with two sheets of metal foil and rolling the interleaved sheets into the form shown in the drawing. The rolled condenser is then dipped into a suitable medium for impregnating the porous dielectric sheets, such as a halogenated aromatic hydrocarbon. The condenser may then be placed in a protective case or otherwise utilized as desired. Fig. 2 shows a section of one turn of the finished rolled condenser showing the alternate metal electrodes and dielectric layers. According to the present invention, the dielectric of the finished condenser contains a halogenated organic compound together with a minor proportion of maleic anhydride or one of its alkyl substituted derivatives.

The maleic anhydride or its derivatives can be most easily introduced into the condenser dielectric by dissolving the desired percentage of the inhibitor in the halogenated aromatic hydrocarbon impregnating compound. Rolled condensers, for example, may be prepared by interleaving any suitable paper, such as linen or kraft paper, between sheets of suitable metal foil, such as aluminum or tin foil, and rolling the interleaved sheets in the conventional manner. The rolled condenser may then be impregnated by a suitable method with a suitable halogenated aromatic compound having dissolved therein a small percentage of maleic anhydride or one of its derivatives.

As stated above, either maleic anhydride or any of its alkyl substituted derivatives may be used for the purpose of the present invention. Among the alkyl substituted derivatives may be mentioned the methyl derivatives, such as citraconic anhydride and dimethyl maleic anhydride, and the ethyl derivatives such as diethyl maleic anhydride. As examples of suitable compounds for impregnating electrical condensers having paper dielectrics may be mentioned chlorinated diphenyl containing 1 per cent maleic anhydride, chlorinated naphthalene containing 1 per cent maleic anhydride, chlorinated diphenyl containing 1 per cent citraconic anhydride, chlorinated naphthalene containing 1 per cent citraconic anhydride, chlorinated diphenyl containing 1 per cent dimethyl maleic anhydride and chlorinated naphthalene containing 1 per cent dimethyl maleic anhydride.

The maleic anhydride or its derivative may be added in any suitable concentration to a halogenated compound to be stabilized. The inhibitors of the present invention show some effectiveness in concentrations as low as .1 per cent by weight of the halogenated compounds but are preferably present in amounts greater than about .25 per cent. The addition of the inhibitor in amounts greater than about 3 per cent by weight will not usually result in any substantial increase in stability. However, obviously, considerably larger proportions of the inhibitor may be employed if they do not impart otherwise undesirable properties to the mixture. About 1 per cent by weight will usually be found a desirable concentration.

The effect of inhibitors in electrical capacitors having halogen-containing dielectrics has been described above. It is obvious that these same inhibitors will be of value in preventing the corrosive action of halogenated aromatic compounds in other pieces of apparatus and under other conditions where they are maintained in contact with metals, particularly with aluminum and tin. In so far as the same general mechanism of corrosion with resultant acceleration of decomposition is common to other organic compounds containing halogen atoms, the same inhibitors will be useful for preventing corrosion, as, for instance, in the case of halogenated straight chain aliphatic hydrocarbons, halogenated alicyclic hydrocarbons, halogenated oxygen-containing organic compounds and other halogen-containing compounds which, by virtue of their halogen content, tend to cause corrosion. For this reason the addition of a small amount of the above-described corrosion inhibitors to any of these halogenated organic compounds intended for technical uses may be desirable as a precaution against the corrosion of metals and the consequent accelerated decomposition of the halogen-containing compound.

The invention has been described in terms of its specific embodiments but it is to be understood that it is of broad application and is to be limited only by the scope of the appended claims.

What is claimed is:

1. A halogenated organic compound which by virtue of its halogen content tends to corrode metallic bodies when maintained in contact with them at elevated temperatures and under an electrical potential, said halogenated compound containing a minor portion of an inhibitor substance selected from the group consisting of maleic anhydride and the substituted derivatives of maleic anhydride.

2. A halogenated aromatic hydrocarbon containing a small proportion of an inhibitor substance selected from the group consisting of maleic anhydride and the substituted derivatives of maleic anhydride.

3. Chlorinated diphenyl containing a small proportion of an inhibitor substance selected from the group consisting of maleic anhydride and the substituted derivatives of maleic anhydride.

4. Chlorinated naphthalene containing a small proportion of an inhibitor substance selected from the group consisting of maleic anhydride and the substituted derivatives of maleic anhydride.

5. In an article or device wherein a metal is maintained in contact with a halogenated organic compound which by virtue of its halogen content tends to attack said metal or to form decomposition products which attack said metal, a corrosion inhibitor dissolved in said halogenated organic compound comprising a substance selected from the group consisting of maleic anhydride and the substituted derivatives of maleic anhydride.

6. In a device in which a dielectric is exposed to an electric potential and is maintained in contact with a metal selected from the group consisting of aluminum and tin, a dielectric comprising a halogenated aromatic hydrocarbon containing a substance selected from the group consisting of maleic anhydride and the substituted derivatives of maleic anhydride.

7. An electric capacitor comprising metal armatures separated by a dielectric comprising a halogenated organic compound which by virtue of its halogen content tends to interact with the metal armatures and an inhibitor substance selected from the group consisting of maleic anhydride and the substituted derivatives of maleic anhydride.

8. An electric capacitor comprising armatures formed of a metal selected from the group consisting of aluminum and tin separated by a dielectric comprising a halogenated aromatic hydrocarbon containing an inhibitor substance selected from the group consisting of maleic anhydride and the substituted derivatives of maleic anhydride.

9. An electric capacitor comprising armatures formed of a metal selected from the group consisting of aluminum and tin separated by a porous spacer impregnated with chlorinated diphenyl containing a minor proportion of maleic anhydride.

10. An electric capacitor comprising armatures formed of a metal selected from the group consisting of aluminum and tin separated by porous spacer impregnated with chlorinated naphthalene containing a minor proportion of maleic anhydride.

LAWSON EGERTON.